United States Patent [19]

Kurnit

[11] 4,338,570
[45] Jul. 6, 1982

[54] RAMAN SCATTERING IN A WHISPERING MODE OPTICAL WAVEGUIDE

[75] Inventor: Norman A. Kurnit, Santa Fe, N. Mex.

[73] Assignee: The United States of America as represented by the United States Department of Energy, Washington, D.C.

[21] Appl. No.: 271,061

[22] Filed: Jun. 8, 1981

[51] Int. Cl.³ ............................................ H03F 7/00
[52] U.S. Cl. ..................................... 330/4.6; 307/426
[58] Field of Search .................. 330/4.5, 4.6; 307/426

[56] References Cited

PUBLICATIONS

Casperson et al., "IEEE J. Quantum Electronics", QE-15, 6, pp. 491–496, Jun. 1979.
Marchic et al., "Applied Physics Letters", 33 pp. 609–611, (1978).
Marchic et al., "Applied Physics Letters", pp. 874–876, (1978).
Marchic et al., "IEEE J. Quantum Electronics", QE-15, 6, pp. 487–490, Jun. 1979.

Primary Examiner—David C. Nelms
Assistant Examiner—Darwin R. Hostetter
Attorney, Agent, or Firm—William W. Cochran, II; Paul D. Gaetjens; Richard G. Besha

[57] ABSTRACT

A device and method for Raman scattering in a whispering mode optical waveguide. Both a helical ribbon and cylinder are disclosed which incorporate an additional curvature $\rho$ p for confining the beam to increase intensity. A Raman scattering medium is disposed in the optical path of the beam as it propagates along the waveguide. Raman scattering is enhanced by the high intensities of the beam and long interaction path lengths which are achieved in a small volume.

7 Claims, 5 Drawing Figures

4,338,570

RAMAN SCATTERING IN A WHISPERING MODE OPTICAL WAVEGUIDE

BACKGROUND OF THE INVENTION

The present invention pertains generally to lasers and more particularly to Raman scattering using optical waveguides. The present invention comprises an improvement over U.S. Pat. No. 4,222,011 entitled "Stokes Injected Raman Capillary Waveguide Amplifier" by Norman A. Kurnit, U.S. Pat. No. 4,224,577 entitled "A Multistaged Stokes Injected Raman Capillary Waveguide Amplifier" by Norman A. Kurnit, U.S. Pat. No. 4,194,170 entitled "Shifting of Infrafed Radiation Using Rotational Raman Resonances in Diatomic Molecular Gases" by Norman A. Kurnit, and U.S. Patent application Ser. No. 229,023 filed Jan. 27, 1981 entitled "A Ring Cavity for a Raman Capillary Waveguide Amplifier" by Norman A. Kurnit and U.S. Patent application Ser. No. 243,309 filed Mar. 13, 1981 entitled "Combination Ring Cavity and Backward Raman Waveguide Amplifier" by Norman A. Kurnit all of which are incorporated herein by reference for all that they teach. This invention is the result of a contract with the Department of Energy (Contract No. W-7405-ENG-36).

It is often desirable, particularly for infrared and longer waveforms, to confine radiation to a small mode volume over distances long compared to the distance for which diffraction spreading is appreciable. Hollow dielectric waveguides such as disclosed in E. A. J. Marcatili and R. A. Schmeltzer, "Hollow Metallic and Dielectric Waveguides for Long Distance Optical Transmission and Lasers," Bell Syst. Tech. J. 43, 1783 (1964), have been used for such confinement and have had numerous applications to the development of discharge-pumped lasers such as disclosed in R. L. Abrams, "Waveguide Gas Lasers," in *Laser Handbook*, Vol. 3, ed. by M. L. Stitch, North Holland, 1979, p. 41, and references therein. Hollow dielectric waveguides have also been used for absorption spectroscopy such as disclosed in M. A. Guerra, A. Sanchez, and A. Javan, "$\nu=2\theta1$ Absorption Spectroscopy of Vibrationally Heated NO Molecules Using Optical Pumping in a Waveguide," Phys. Rev. Lett. 38, 482 (1977), optical pumping such as disclosed in M. Yamanaka, "Optically Pumped Waveguide Lasers," J. Opt. Soc. Am. 67, 952 (1977), and stimulated Raman scattering such as disclosed in P. Rabinowitz, A. Kaldor, R. Brickman, and W. Schmidt, "Waveguide $H_2$ Raman Laser," Appl. Op. 15, 2005 (1976), N. A. Kurnit, G. P. Arnold, L. M. Sherman, W. H. Watson, and R. G. Wenzel, "$CO_2$-Pumped p-$H_2$ Rotational Raman Amplification in a Hollow Dielectric Waveguide," Conference on Lasers and Electro-optic Systems, CLEOS/ICF '80, San Diego Calif., Feb. 1980. However, very long lengths of such dielectric waveguides are cumbersome and difficult to construct particularly since tight tolerances with regard to straightness are required in order to prevent conversion into lossy higher-order modes.

Bent rectangular metallic waveguides have been studied extensively by E. Garmire, T. McMahon, and M. Bass, "Propagation of Infrared Light in Flexible Hollow Waveguides," Appl. Opt. 15, 145 (1976), E. Garmire et al., "Flexible Infrared-Transmissive Metal Waveguides," Appl. Phys. Lett. 29, 254 (1976), E. Garmire et al., "Lowloss Optical Transmission Through Bent Hollow Waveguides," Appl. Phys. Lett. 31, 92 (1977), E. Garmire et al., "Low-loss Propagation and Polarization Rotation in Twisted Infrared Metal Waveguides," Appl. Phys. Lett. 34, 35 (1979), E. Garmire et al., "Flexible Infrared Waveguides for Highpower Transmission," IEEE J. Quant, Electron., QE-16, 23 (1980), as a means of steering $CO_2$ laser radiation for cutting, welding, and surgery. The principal disadvantage of bent rectangular metallic waveguides is that the walls perpendicular to the electric field give a relatively large attenuation coefficient. For straight metallic waveguides, it has been demonstrated, however, that the walls perpendicular to the electric field may be removed completely if the walls parallel to the electric field are given a slight curvature ($\rho$) which keeps the mode focused in the center of the guide such as disclosed by T. Nakahara and N. Kurauchi, "Guided Beam Waves Between Parallel Concave Reflectors," IEEE Trans. on Microwave Theory and Techniques, MTT-15, 66 (1967), H. Nishihara, T. Inoue, and J. Koyama, "Low-Loss Parallel-Plate Waveguide at 10.6 $\mu$m," Appl. Phys. Lett. 25, 391 (1974), H. Nishihara, T. Mukai, T. Inoue, and J. Koyama, "Self-Focusing Parallel-Plate Waveguide $CO_2$ Laser with Uniform Transverse Excitation," Appl. Phys. Lett. 29, 577 (1976). Use of such a waveguide bent in a circle or helix has been previously proposed by M. E. Marhic, L. I. Kwan, and M. Epstein, "Optical Surface Waves Along a Toroidal Metallic Guide," Appl. Phys. Lett. 33, 609 (1978), M. E. Marhic et al., "Invariant Properties of Helical-Circular Metallic Waveguides," Appl. Phys. Lett. 33, 874 (1978), M. E. Marhic et al., "WhisperingGallery $CO_2$ Laser," IEEE J. Quantum Electron. QE-15, 478 (1979), L. W. Casperson and T. S. Garfield, "Guided Beams in Concave Metallic Waveguides," IEEE J. Quantum Electron. QE-15, 491 (1979), for flexible guiding of $CO_2$ laser radiation and the construction of a $CO_2$ laser. However, this is the only disclosed use of this device.

SUMMARY OF THE INVENTION

It is therefore an object of the present invention to provide an improved device for Raman scattering.

It is also an object of the present invention to provide a device for confining an optical beam over long interaction path lengths at high energy intensities.

Another object of the present invention is to provide a device for confining an optical beam over long interaction path lengths at high energy intensities in a compact volume.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a device for Raman scattering a $CO_2$ laser beam propagated by a waveguide comprising: waveguide means having a substantially cylindrical surface with a radius R for propagating said $CO_2$ laser beam in a helical direction along said cylindrical surface, said cylindrical surface having an additional curvature formed therein with a radius $\rho$ which confines said $CO_2$ laser beam to a small mode volume and a high intensity as said $CO_2$ laser beam propagates along said waveguide means; means for confining a hydrogen isotope Raman scattering medium in the propagation path of said $CO_2$ laser beam as said optical beam propagates along said waveguide means to cause Raman scattering of said $CO_2$ laser beam; whereby Raman amplification is achieved in said device by providing long interaction path lengths between said $CO_2$ laser beam and said hydrogen isotope Raman scattering medium at high intensities.

The present invention may also comprise, in accordance with its objects and purposes, a device for Raman scattering an optical beam propagated by a waveguide comprising: an optical beam; waveguide means having a substantially cylindrical surface with a radius of curvature R for propagating said optical beam; groove means formed in a substantially helical path along said cylindrical surface of said waveguide for confining said optical beam to a small mode volume and high intensity as said optical beam propagates along said cylindrical surface in a helical propagation path in said groove means, said groove means having a radius of curvature $\rho$ which is essentially transverse to said radius of curvature R; a gaseous Raman scattering medium disposed in said helical propagation path of said optical beam; whereby Raman scattering of said optical beam is enhanced by providing long interaction lengths with said gaseous absorption medium at high intensities.

The present invention may also comprise, in accordance with its objects and purposes, a method of using a whispering mode optical waveguide comprising applying an optical beam to said waveguide at a small incidence angle with a polarization direction essentially parallel to said waveguide; maintaining a gaseous Raman scattering medium in contact with said waveguide to cause Raman scattering of said optical beam.

The advantages of the present invention are that the optical beam can be propagated with a small mode volume and consequently at a higher intensity over long-path lengths. This enhances Raman scattering of the optical beam when passing through a Raman scattering medium. Additionally, by bending the waveguide into a helix or spiral, long-path lengths can be achieved in a compact volume without the requirements of tight tolerances of straight dielectric waveguides. Also, the beam remains confined in a region near the outer wall, so that the second wall utilized by T. Nakahara and N. Kurauchi, "Guided Beam Waves Between Parallel Concave Reflectors," IEEE Trans. on Microwave Theory and Techniques, *MTT*-15, 66 (1967), H. Nishihara, T. Inoue, and J. Koyama, "Low-Loss Parallel-Plate Waveguide at 10.6 μm," App. Phys. Lett. 25, 391 (1974), H. Nishihara, T. Mukai, T. Inoue, and J. Koyama, "Self-Focusing Parallel-Plate Waveguide $CO_2$ Laser with Uniform Transverse Excitation," Appl. Phys. Lett. 29, 577 (1976), can be removed. This greatly simplifies the fabrication process since only a single curved boundary is required which, consequently, greatly reduces fabrication costs.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

Figure 1:
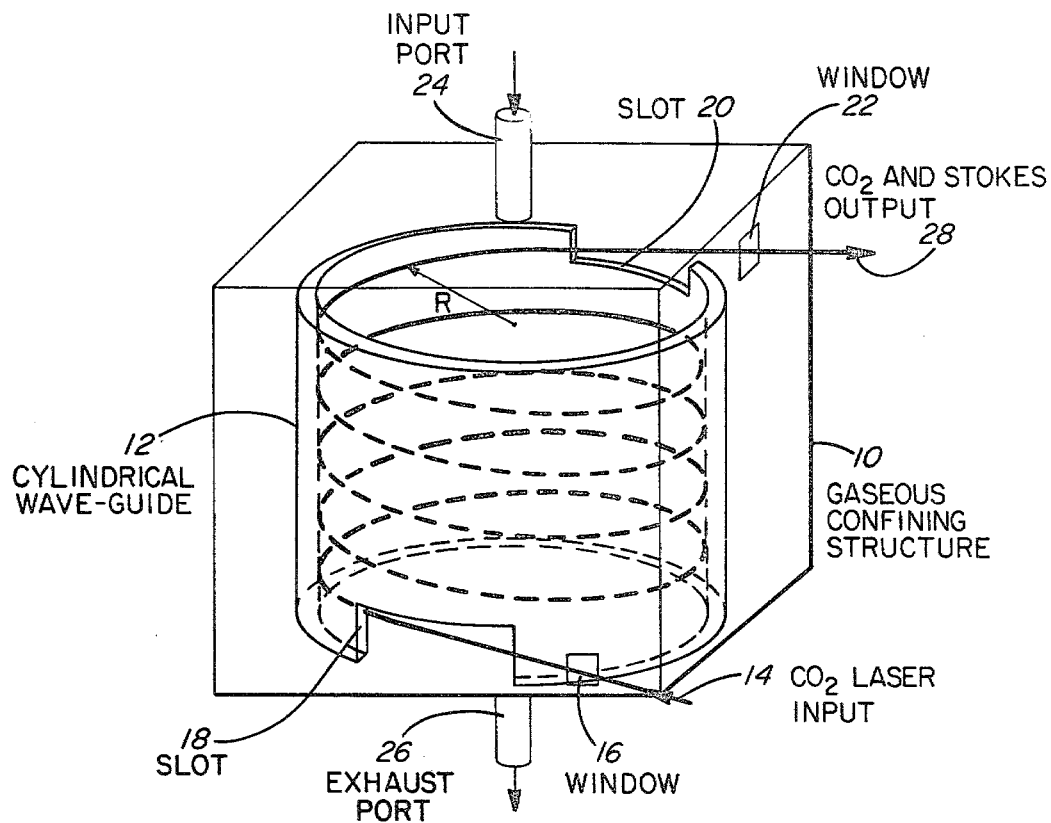
FIG. 1 is a schematic perspective view of the cylindrical waveguide of the present invention.

FIG. 1 discloses a schematic perspective view of the cylindrical waveguide device of the present invention. As illustrated in FIG. 1, a gaseous confining structure 10 surrounds a cylindrical waveguide 12. An optical beam, such as $CO_2$ laser input 14, is directed through the gaseous confining structure 10 via window 16. The optical beam 14 is directed through slot 18 in cylindrical waveguide 12 so that the optical beam 14 impinges upon the inner surface of cylindrical waveguide 12 at a small incidence angle. The optical beam 14 is then directed around the inner surface of cylindrical waveguide 12 by a series of minute reflections so that it "whispers" along the inner surface in the same manner disclosed by Lord Rayleigh (J. W. Strutt), *Theory of Sound*, § 287, MacMillan, 1894, Vol. 2, p. 126; Lord Rayleigh, "The Problem of the Whispering Gallery," Phil. Mag. 20, 1001 (1910) (Scientific Papers, Vol. 5, Cambridge Univ. Press, 1912, p. 617); Lord Rayleigh, "Further Application of Bessel's Functions of High Order to the Whispering Gallery and Allied Problems," Phil. Mag. 27, 100 (1914) (Scientific Papers, Vol. 6, Cambridge Univ. Press, 1920, p. 211), in connection with the "whispering gallery" phenomenon in St. Paul's Cathedral. The pitch of the optical beam 14 causes it to form a helical path around the inner surface of cylindrical waveguide 12 before it is emitted by slot 20 and window 22. Input 24 provides a Raman scattering medium such as $H_2$, $D_2$, DT, $T_2$, etc. to the gaseous confining structure 10. The Raman scattering medium is maintained in the gaseous confining structure 10 at a predetermined pressure and exhausted by exhaust port 26. As the optical beam 14 is transmitted along the inner surface of cylindrical waveguide 12, Raman scattering occurs due to the high intensity and long interaction length of the beam with the Raman scattering medium. As a result, output 28 contains both $CO_2$ and Stokes frequencies.

Figure 2:
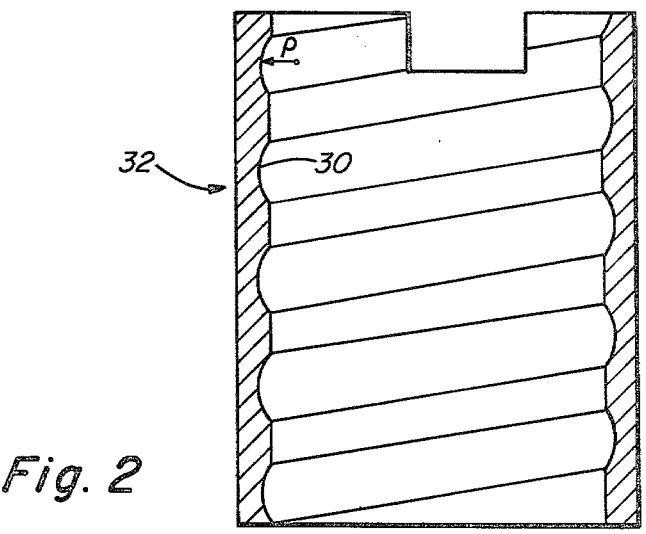
FIG. 2 is a schematic cross-sectional view of the cylindrical waveguide of the present invention.

FIG. 2 is a schematic cross-sectional diagram of the cylinder waveguide of the present invention. As disclosed in FIG. 2, a curvature $\rho$ is formed along the inner surface 30 of the cylindrical waveguide 32. The curvature $\rho$ is formed in a helical path to correspond to the helical path of an optical beam transmitted around the inner surface of the cylindrical waveguide 32. The curvature $\rho$ functions to confine to the mode of the optical beam so that it maintains a high intensity as it is transmitted along the inner surface of the groove. In other words, the curvature $\rho$ functions to refocus the beam at each bounce to keep it confined to a small volume and, consequently, a high intensity as it travels around the inner surface of the cylindrical waveguide 32. The higher intensities enhance Raman scattering of the optical beam.

An attractive feature of the cylindrical waveguide illustrated in FIGS. 1 and 2 is that for light polarized tangential to the surface of the cyindrical waveguide, the glancing-incidence reflectivity of metals in the infrared approaches 100% as the incidence angle $\theta$ becomes small. For a highly reflecting metal in the infrared, the loss per bounce is given by $A \approx A_N \sin \theta \sim A_N \theta$, where $A_N = 1 - R_N$ is the normal incidence loss, such as discussed by E. Garmire, Appl. Opt. 15, 3037 (1976), E. Garmire, T. McMahon and M. Bass, Appl. Phys. Letters 31, 92 (1977); IEEE J. Quant, Electron. QE-16, 23 (1980); and, H. Krammer, Appl. Opt. 16, 2163 (1977), 17, 316 (1978). Consequently, for N successive reflections through an angle $\phi = 2N\theta$, the total loss is given by $NA = A_N \phi/2$, which is independent of the radius R of the bend. In other words, the total loss of energy is not dependent upon the radius of the waveguide but only upon the total angle which the waveguide traverses. For one complete revolution, the loss is $\sim = A_N$, which is on the order of 4% or less for infrared radiation polarized tangential to the cylindrical surface.

As a result of the loss being independent of the radius R of the cylindrical waveguide, long-path lengths can be achieved with the low loss using a cylindrical waveguide with a large radius R. Moreover, the loss is distributed over a large surface area so that damage thresholds are very high. This results from both the surface loss being proportional to $\sin \theta$ and the beam being spread on the surface (relative to its cross-section, by an additional factor of $\sin \theta$). Thus, the energy density which the reflective surface can handle without damage is increased by $1/\sin^2\theta$ compared to the same surface at normal incidence.

Figure 3:
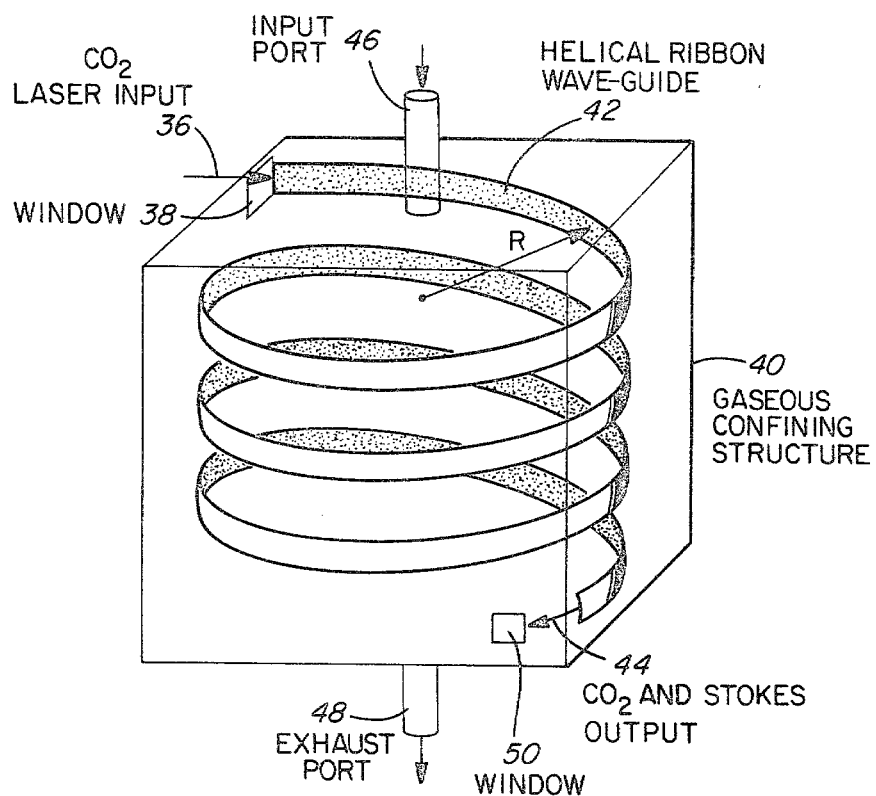
FIG. 3 is a schematic perspective view of a helical ribbon waveguide of the present invention.

FIG. 3 illustrates the helical ribbon waveguide of the present invention. As illustrated in FIG. 3, an optical beam 36 is inserted through window 38 of gaseous confining structure 40 so that it impinges upon the helical ribbon waveguide 42 at a small incidence angle $\theta$. The helical ribbon waveguide 42 has a radius of curvature R and is formed in a helical pattern to transmit optical beam 36 through the gaseous confining structure 40. Input port 46 provides a Raman scattering medium at a predetermined pressure within the gaseous confining structure 40 which is exhausted by exhaust port 48. The output optical beam 44 comprises both $CO_2$ and Stokes output frequencies. Window 50 formed in the gaseous confining structure 40 provides an output for output optical beam 44.

Figure 4:
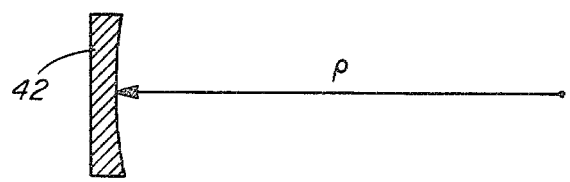
FIG. 4 is a cross-section of the helical ribbon waveguide of the present invention illustrating the curvature $\rho$.

FIG. 4 illustrates a cross-section of the helical ribbon waveguide 42 of FIG. 3. As shown in FIG. 4, the helical ribbon waveguide 42 has an additional curvature $\rho$ formed on the optical reflecting surface in the same manner as illustrated in FIG. 2. Again, curvature $\rho$ functions to confine the optical beam to a small mode volume to increase intensity and thereby enhance Raman scattering.

The advantage of the helical ribbon waveguide 42 illustrated in FIGS. 3 and 4 is that it can be bent to any desired radius R unlike the solid cylinder illustrated in FIGS. 1 and 2. As stated previously, the change in radius R does not affect losses of the waveguide but merely shortens or lengthens the beam path. Additionally, the radius R of the helical ribbon waveguide 42 can be made progressively larger or smaller to produce a spiral waveguide if desired.

Figure 5:
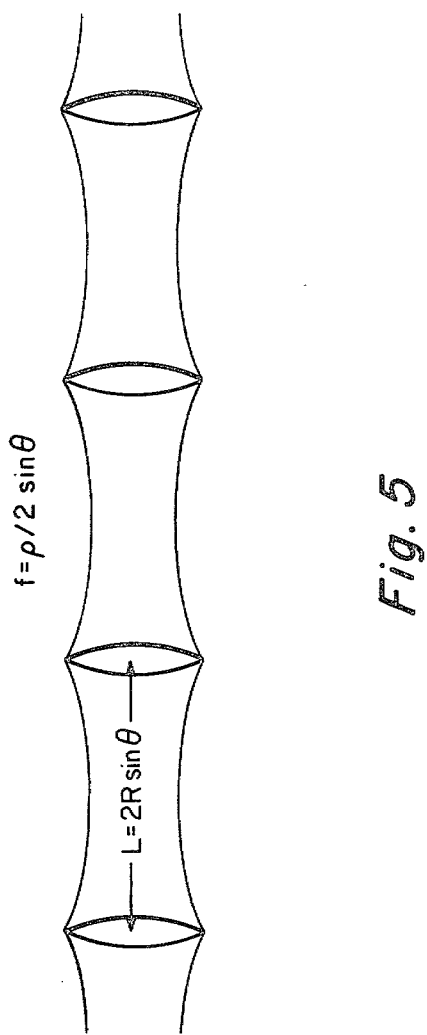
FIG. 5 is a schematic illustration of the equivalent lens waveguide of the device of the present invention.

The focusing effects, or mode confinement in the transverse direction of the curvature $\rho$ illustrated in FIGS. 2 and 4, can be calculated using a standard lens waveguide approach given, for example, in *An Introduction to Lasers and Masers* by A. E. Seigman, McGraw Hill, 1971, Ch. 8, by considering the reflection from successive cylindrical mirrors of radius $\rho$, with an angle $\theta$ to the tangent, giving a focal length $f = \rho/(2 \sin \theta)$, separated by a distance $L = 2R \sin \theta$. The equivalent lens waveguide is illustrated in FIG. 5 and predicts a Gaussian beam in the transverse dimension with $1/e$ radius $w_o = (\lambda \sqrt{\rho R}/\pi)^{\frac{1}{2}}$. For a 10 $\mu$m optical beam with $\rho = 10$ cm and $R = 1$ m, the calculated beam waste $w_o = 1$ mm. The beam size changes negligibly between a waist and a reflection for small $\theta$. The same analysis predicts that a ray inserted off-axis will oscillate sinsoidally with a repeat distance along the guide of $2\pi\sqrt{\rho R}$.

Consequently, the present invention provides a device and method for Raman scattering which increases beam intensity and interaction path length to enhance the Raman scattering process. This can be achieved in a relatively small volume and is dependent upon the total angle traversed by the beam rather than the traversed length, so that long interaction lengths are easy to obtain. Moreover, the glancing-incidence reflectivity of metals in the infrared approach 100% as the grazing angle $\theta$ becomes small. For a total change of direction of 360°, losses of 4% or less have been shown. Long interaction lengths also allow the loss to be distributed over a large surface so that damage thresholds remain high on the surface of the cylindrical waveguide. The disadvantages and limitations of tight tolerances of straightness or long lengths encountered with dielectric waveguides are eliminated in the device of the present invention. Moreover, since the optical beam is confined to a region on a single reflective surface, the device of the present invention can be fabricated in a simple and easy manner.

The foregoing description of the preferred embodiment of the invention has been presented for purposes of illustration and description. It is not intended to be exhaustive or to limit the invention to the precise form disclosed, and obviously many modifications and variations are possible in light of the above teaching. For example, the waveguide of the present invention can be used for discharge pumped lasers, absorption spectroscopy, optical pumping, ring resonators, optical delay lines, the study of adsorbed molecules or thin surface films such as disclosed by R. W. Hannah, "An Optical Accessory for Obtaining the Infrared Spectra of Very Thin Films," Appl. Spectroscopy 17, 23 (1963), G. W. Poling, "Infrared Reflection Studies of the Oxidation of Copper and Iron," J. Electrochem. Soc. 116, 958 (1969), if used with an electric field polarized perpendicular to the surface. Additionally, a cylindrical surface of an absorbing material turned inward in a single spiral turn could provide a convenient beam dump or calorimeter for high power laser radiation since the radiation would be absorbed over a large surface area after many reflections, and very little light scattered would be able to exit the device. The device could also possibly be used for an acousto optical cell. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device for Raman scattering a $CO_2$ laser beam propagated by a waveguide comprising:

waveguide means having a substantially cylindrical surface with a radius R for propagating said $CO_2$ laser beam in a helical direction along said cylindrical surface, said cylindrical surface having an additional curvature formed therein with a radius $\rho$ which confines said $CO_2$ laser beam to a small mode volume and a high intensity as said $CO_2$ laser beam propagates along said waveguide means;

means for confining a hydrogen isotope Raman scattering medium in the propagation path of said $CO_2$ laser beam as said $CO_2$ laser beam propagates along said waveguide means to cause Raman scattering of said $CO_2$ laser beam;

whereby Raman amplification is achieved in said device by providing long interaction path lengths between said $CO_2$ laser beam and said hydrogen isotope Raman scattering medium at high intensities.

2. The device of claim 1 wherein said waveguide means comprises a helical coil.

3. The device of claim 1 wherein said waveguide means comprises a grooved cylinder.

4. A device for Raman scattering an optical beam propagated by a waveguide comprising:

an optical beam;

waveguide means having a substantially cylindrical surface with a radius of curvature R for propagating said optical beam;

groove means formed in a substantially helical path along said cylindrical surface of said waveguide for confining said optical beam to a small mode volume and high intensity as said optical beam propagates along said cylindrical surface in a helical propagation path in said groove means, said groove means having a radius of curvature $\rho$ which is essentially transverse to said radius of curvature R;

a gaseous Raman scattering medium disposed in said helical propagation path of said optical beam;

whereby Raman scattering of said optical beam is enhanced by providing long interaction lengths with said gaseous absorption medium at high intensities.

5. The device of claim 4 wherein said waveguide means comprises a helical coil.

6. The device of claim 4 wherein said waveguide means comprises a grooved cylinder.

7. A method of using a whispering mode optical waveguide comprising:

applying an optical beam to said whispering mode optical waveguide at a small incidence angle with a polarization direction essentially parallel to said waveguide;

maintaining a gaseous Raman scattering medium in the propagation path of said optical beam along said waveguide to cause Raman scattering of said optical beam.

* * * * *